UNITED STATES PATENT OFFICE.

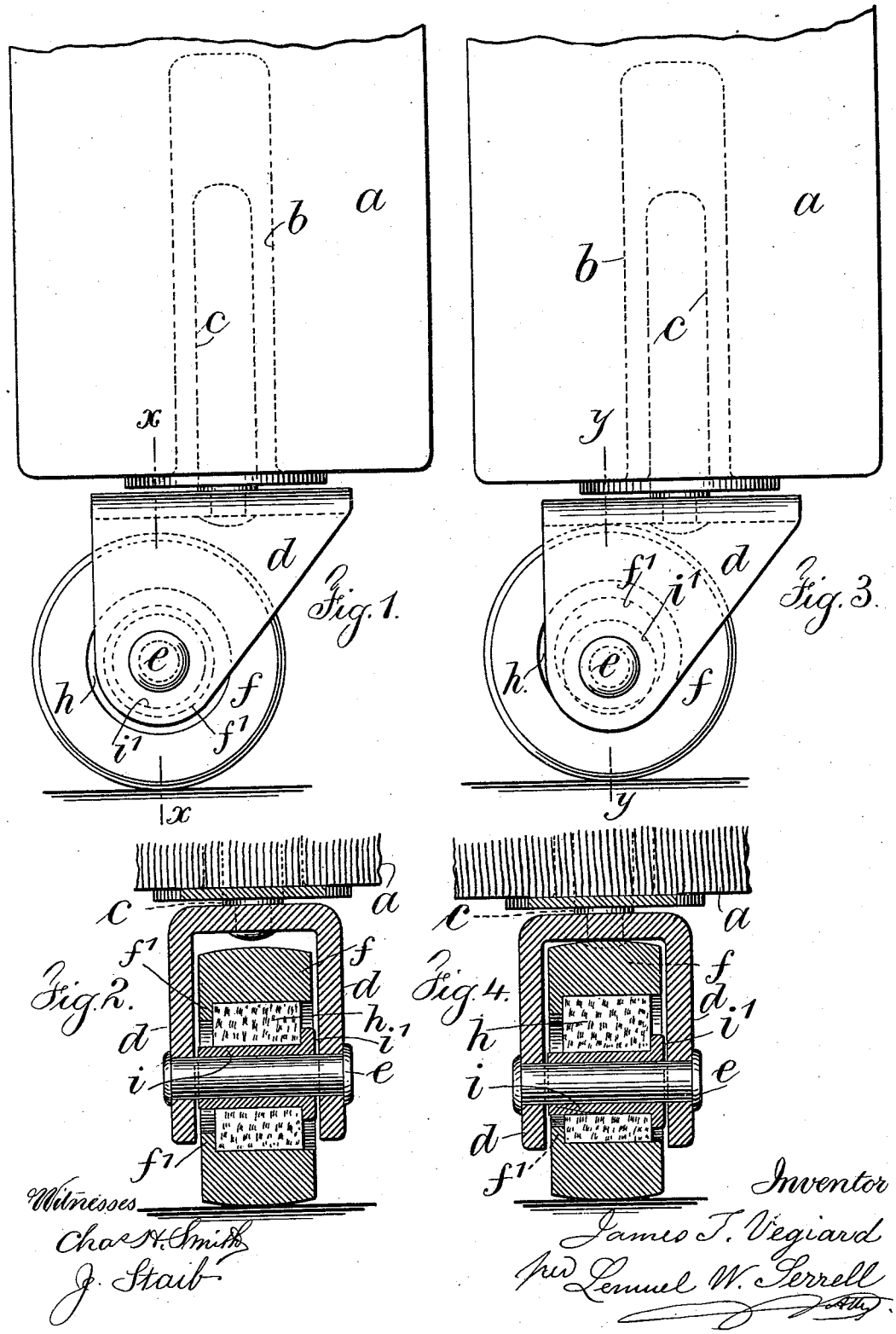

JAMES T. VEGIARD, OF PLAINFIELD, NEW JERSEY, ASSIGNOR TO HIMSELF, GARRET Q. PACKER, AND THOMAS H. CUNDY, OF SAME PLACE.

FURNITURE-CASTER.

SPECIFICATION forming part of Letters Patent No. 523,801, dated July 31, 1894.

Application filed December 1, 1893. Serial No. 492,435. (No model.)

*To all whom it may concern:*

Be it known that I, JAMES T. VEGIARD, a citizen of the United States, residing at Plainfield, in the county of Union and State of New Jersey, have invented a new and useful Improvement in Furniture-Casters, of which the following is a specification.

In the use of chairs, sofas, and articles of furniture employing casters, inconvenience often arises from the backward movement of the chair just as a person sits therein. This arises primarily from the weight and backward movement of the body; and the freedom of movement of the caster at this time often causes the back of a chair to come into contact with and mar or injure woodwork or wall, and the object of my invention is to overcome these difficulties by providing a caster having a locking function.

In my improvement the casters are normally adapted to carry the weight of the article upon which they are placed and to turn freely as such article is moved about a room, but my improved caster is also so constructed that when weight is added to the chair, sofa or other article, there is a yielding action that transfers the weight upon the caster from the pin or axle to the rim of the roller; or in other words, the top portion of the yoke-piece comes down upon the rim of the roller and a locking action is effected by preventing the roller turning.

My caster roller is of rigid material and has an open center into which is forced a cylindrical rubber block, and a sleeve of metal passes through a central opening in said rubber block and the axle of the caster passes through this metal sleeve and through the yoke-piece, and its ends are upset to secure the axle in place as is usual. The periphery of the roller turns in close proximity to the yoke piece and the rubber block yields with an excess of weight and permits the metal of the yoke-piece to come down in contact with the rigid top of the caster wheel or roller.

In the drawings, Figure 1 is an elevation showing my improvement in a normal position, and Fig. 2 is a vertical cross section at the line $x, x$ of Fig. 1. Fig. 3 is an elevation, and Fig. 4 a vertical cross section at the line $y, y$ of Fig. 3, showing the position of the parts under excess of weight.

$a$ represents part of the leg of a chair, sofa or other similar article of furniture; $b$ the metal socket therein, and $c$ the vertical pintle; $d$ the frame or yoke-piece to which the pintle $c$ is permanently connected, and $e$ the axle. These parts are of any well known and usual construction and do not require further description.

The caster roller $f$ is of rigid material and has an open center and at one side an internal flange $f'$ which reduces the size of the opening in the roller. A cylindrical block of soft rubber $h$ (similar to the gray rubber of commerce used for springs, buffers, &c.) having a central opening is forced into the open center of the roller down to the flange $f'$, and said block of rubber does not quite fill the opening in the roller widthwise, as shown in Figs. 2 and 4.

A metal sleeve or bearing $i$, preferably having a head $i'$ or enlargement at one end, is inserted into the open center of the cylindrical rubber block $h$, either before or after the same is placed in the roller. This sleeve $i$ receives the axle $e$ through it, and said sleeve and its head are to be of a length to fit between the yoke-frame $d$ and the periphery of the roller of rigid material turns in close proximity to the yoke frame. The head $i'$ sets over the rubber block $h$ and prevents any tendency of the same to come out of the roller $f$ at one side while the flange $f'$ acts in a like capacity at the other side.

Figs. 1 and 2 show the normal position of the caster as supporting the weight of the article of furniture on which it is placed, and Figs. 3 and 4 show the position occupied under excess of weight such as that produced by a person sitting in a chair, and in which condition the cylindrical rubber block has yielded and the weight has brought the yoke-piece down on the rim of the roller $f$ of rigid material, preventing the roller turning and producing a locking effect which prevents the article of furniture from moving along over the floor.

I claim as my invention—

1. The combination in a caster with the yoke frame and axle, of a roller of rigid material having an open center and a periphery that moves in close proximity with the yoke frame, a block of rubber forced into the open center of the roller and through which the axle passes, said rubber yielding under excess of pressure to permit the rigid roller and yoke frame to come together to prevent the roller turning, substantially as set forth.

2. The combination in a caster with the yoke frame and axle, of a roller of rigid material having an open center and a periphery that moves in close proximity with the yoke frame, a block of rubber forced into the open center of the roller, and a metal sleeve passing through the rubber block and surrounding the axle and turning thereon, said rubber yielding under excess of pressure to permit the rigid roller and yoke frame to come together to prevent the roller turning, substantially as set forth.

3. The combination in a caster with the yoke frame and axle, of a roller of rigid material having an open center and a periphery that moves in close proximity with the yoke frame, and an inturned flange at $f'$ at one end, a block of rubber forced into the open center of the roller, and a metal sleeve passing through the rubber block and surrounding the axle and having a head $i'$ at one end, said flange and head preventing the displacement of the rubber block, said rubber yielding under excess of pressure to permit the rigid roller and yoke frame to come together to prevent the roller turning, substantially as set forth.

Signed by me this 25th day of November, A. D. 1893.

JAMES T. VEGIARD.

Witnesses:
JOHN KIRCH, Jr.,
RENÉ VON MINDEN.